(12) United States Patent
Shan et al.

(10) Patent No.: US 8,220,207 B2
(45) Date of Patent: Jul. 17, 2012

(54) ROOF STRUCTURE FOR A GRAIN BIN

(75) Inventors: Yuqin Shan, Winnipeg (CA); Bruce Allen, Selkirk (CA)

(73) Assignee: Vicwest Corporation, Oakville, Ontario (CA)

( * ) Notice: Subject to any disclaimer, the term of this patent is extended or adjusted under 35 U.S.C. 154(b) by 269 days.

(21) Appl. No.: 12/539,227

(22) Filed: Aug. 11, 2009

(65) Prior Publication Data

US 2010/0307072 A1    Dec. 9, 2010

Related U.S. Application Data

(60) Provisional application No. 61/183,685, filed on Jun. 3, 2009.

(51) Int. Cl.
*E04B 7/00*    (2006.01)

(52) U.S. Cl. .............................. 52/82; 52/223.3; 52/246

(58) Field of Classification Search ......... 52/82, 651.11, 52/18, 192, 245, 246, 223.3, 650.1, 653.2
See application file for complete search history.

(56) References Cited

U.S. PATENT DOCUMENTS

| | | | | |
|---|---|---|---|---|
| 1,114,639 A | * | 10/1914 | Oberer | 52/82 |
| 1,117,600 A | * | 11/1914 | Plue | 52/82 |
| 4,275,534 A | * | 6/1981 | Porter | 52/82 |
| 4,720,947 A | * | 1/1988 | Yacaboni | 52/81.3 |
| 7,017,307 B2 | * | 3/2006 | Jones et al. | 52/90.1 |
| 7,963,072 B2 | * | 6/2011 | Anderson et al. | 52/82 |

OTHER PUBLICATIONS

LYSAGHT Zed sections, May 2009 archived webpage.*

* cited by examiner

*Primary Examiner* — Jeanette E Chapman
*Assistant Examiner* — Daniel Kenny
(74) *Attorney, Agent, or Firm* — Adrain D. Battison; Ade & Company Inc.

(57) ABSTRACT

A roof for a large diameter grain bin is formed by roof rafters inclined from a top of the wall to a top ring, with sheet metal panels in an upper row extending from the ring to a circular bottom edge and a lower row extending from a circular top edge to the wall. A circular bracket of Z-shaped cross section is carried on the rafters by upstanding support legs and provides an upper flange engaging the bottom edge of the upper row and a lower flange engaging the top edge of the lower row and an interconnecting web portion. One or both rows are supported at a mid point on a cylindrical tube bent to form a circle butting the panels and supported from the rafters on leg members which include a center strap which can be bent around the tube and two legs bolted to the rafters.

33 Claims, 11 Drawing Sheets

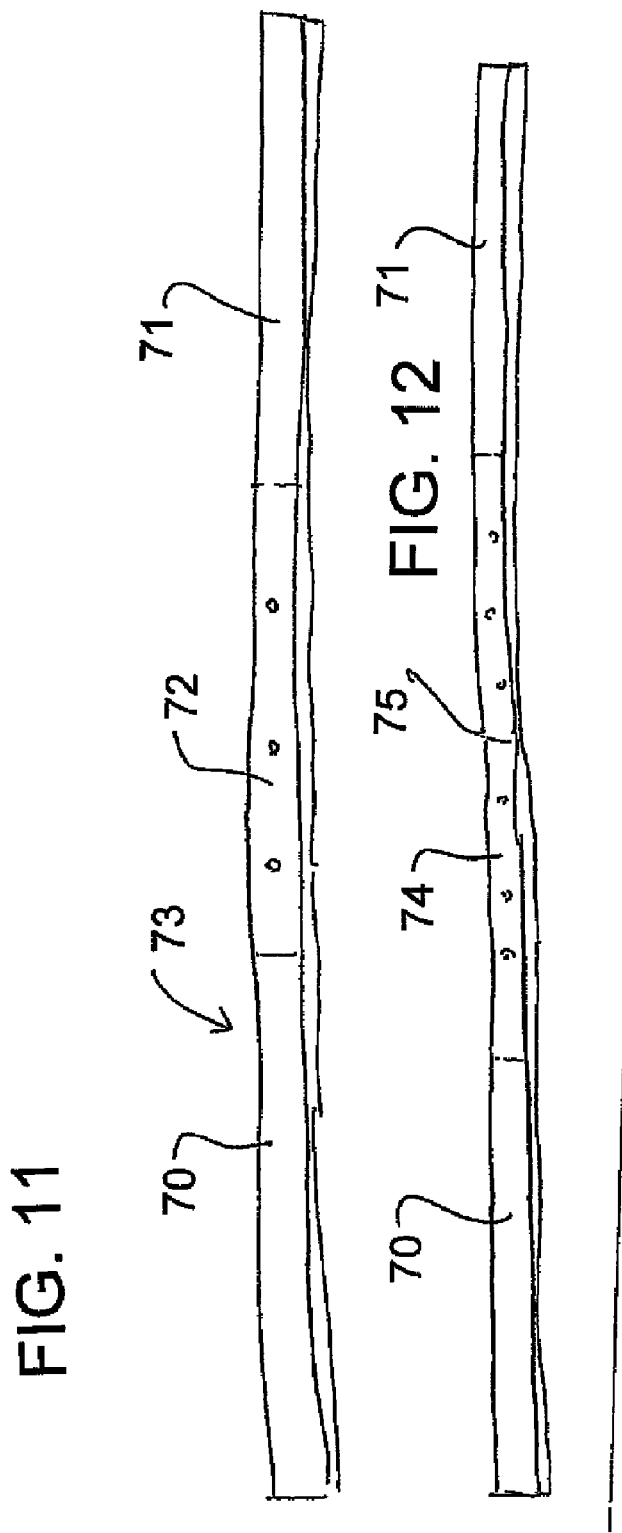

ROOF STRUCTURE FOR A GRAIN BIN

This application claims the benefit under 35 USC 119 of Provisional Application 61/183,685 filed Jun. 3, 2009.

This invention relates to grain bins and particularly to a roof structure to be used primarily on larger bins over 50 feet in diameter.

BACKGROUND OF THE INVENTION

Harvested grain may be dried and stored for extended lengths of time in grain silos or grain bins, because of fluctuating market conditions. Additionally, moist grain may be held in bins and then heated with forced air to extract the moisture. Grain bins typically include a cylindrical body and a conical roof. The body can be a peripheral wall typically comprised of bolted or welded, smooth or corrugated wall panels. The conical roof can have a 20-40 degree slope, and is typically comprised of pie-shaped or radial roof panels with integrated ribs or stiffeners along the two long sides of the panels. These ribs provide strength and stiffness to the panels, allowing them to span between the storage structure's walls and a top annular ring collar or to intermediate structural elements located beneath or above the panels.

Grain is typically loaded into these structures through a fill hole at the top of the roof and unloaded via an under floor auger system accessed through operable floor sumps. Because grain may be stored for a relatively long time, methods for preserving the condition of the grain against moisture, temperature, and insects are used. To aid in preserving grain against moisture, grain storage structures typically employ an under floor aeration system, utilizing fans which distribute air horizontally through a plenum space, vertically through a perforated floor into the grain mass, and out through vents located in the roof of the structure.

The roof must be structured to accommodate snow and wind loads while being suitably simple to construct and inexpensive in material costs.

SUMMARY OF THE INVENTION

It is one object of the invention to provide a roof structure for a grain bin.

According to one aspect of the invention there is provided a roof structure for a cylindrical grain bin comprising:

a plurality of roof rafters, each extending from a top edge of a wall of the bin to a top support member, with the rafters being angularly spaced around the wall and with each rafter being inclined upwardly and inwardly from the wall to the top support member;

a plurality of sheet metal panels connected edge to edge so as to cover the rafters and define a conical roof covering an open area within the wall of the bin;

the panels including an upper row of panels arranged side by side around the roof extending from the ring to a circular bottom edge of the upper row at a circular location surrounding the rafters and spaced part way down the rafters;

the panels including a lower row of panels arranged side by side around the roof extending from a circular top edge of the lower row adjacent the circular bottom edge of the upper row to a circular bottom edge of the lower row;

and a circular bracket member carried on the rafters at the circular location for supporting the circular bottom edge of the upper row and the circular top edge of the lower row;

the circular bracket member forming substantially a circular ring spanning the rafters at the circular location;

the circular bracket member including an upper flange engaging the circular bottom edge of the upper row, a lower flange engaging the circular top edge of the lower row and an interconnecting web portion connecting the upper and lower flanges wherein the circular bracket member is supported relative to the rafters at a position with the lower flange spaced upwardly from the rafters so as to support the top edge of the panels of the lower row spaced upwardly from the rafters.

It will be appreciated that there may be only two rows of panels in typical common bin sizes or there may be more rows, generally three, in the largest bins. In this case the upper and lower rows defined above relate to the uppermost and middle rows and there may be therefore an additional lowermost row.

Preferably the circular bracket member is supported relative to the rafters on a plurality of support legs, with each leg being attached to a respective one of the rafters and standing upwardly therefrom to the circular bracket member. However other mounting arrangements may be provided to hold the member at a raised position relative to the rafters Preferably the upper and lower flanges are parallel and spaced by the height of the interconnecting web to form a Z-shape in cross section.

Preferably the interconnecting web is imperforate and extends around the full periphery of the roof at the circular location so as to act as a barrier to inhibit penetration of moisture between the top edge of the lower row and the bottom edge of the upper row. The interconnecting web can carry a foam compressible gasket in engagement with the upper ends of the lower row to further prevent the penetration of moisture between the flange and the upper end.

Preferably there is provided at least one roof panel support member supported from the rafters at a height above the rafters for supporting the panels of the upper row and a similar roof supporting member for the lower row of panels. The roof panel support member is located at a position part way down the panels, with the roof panel support member being circular so as to engage all of the roof panels supported thereby substantially across the full width of each panel.

Preferably the roof panel support member is formed from a tube bent to follow the circular shape of the roof at the panels.

Preferably the tube is circular in cross section.

Preferably the cylindrical tube is supported from the rafters by support leg members, each of which extends upwardly from a respective one of the rafters to hold the roof panel support member and the panels engaged thereby spaced upwardly from the rafters.

For simple convenient assembly, each support leg member is preferably U-shaped with a U-shaped base forming a strap and arranged to wrap around the roof panel support member and with first and second legs of the support leg member each attached to the respective rafter and each support leg member has a receptacle into which the roof panel support member sits while the roof panel support member is supported from the rafter by the first leg which is attached to the rafter and while the second is bent around the roof panel support member for attachment to the rafter.

Preferably the support leg member is bolted between the first and second legs immediately underneath the roof panel support member so as to clamp the roof panel support member at the base.

Preferably there is provided a first roof panel support member for supporting the upper row and a second roof panel support member for supporting the lower row.

According to a second aspect of the invention there is provided a roof structure for a cylindrical grain bin comprising:

a plurality of roof rafters, each extending from a top edge of a wall of the bin to a top support member, with the rafters being angularly spaced around the wall and with each rafter being inclined upwardly and inwardly from the wall to the top support member;

at least one row of sheet metal panels connected edge to edge so as to cover at least part of the rafters and define a conical roof;

wherein there is provided a roof panel support member supported from the rafters above the rafters for supporting the panels;

said roof panel support member being located at a position part way down the panels;

the roof panel support member being circular so as to engage all of the roof panels supported thereby substantially across the full width of each panel;

wherein the roof panel support member is supported from the rafters to hold the roof panel support member and the panels engaged thereby spaced upwardly from the rafters.

According to a third aspect of the invention there is provided a roof structure for a cylindrical grain bin comprising:

a plurality of roof rafters, each extending from a top edge of a wall of the bin to a top support member, with the rafters being angularly spaced around the wall and with each rafter being inclined upwardly and inwardly from the wall to the top support member;

at least one row of sheet metal panels connected edge to edge so as to cover at least part of the rafters and define a conical roof;

wherein there is provided a roof panel support member supported from the rafters above the rafters for supporting the panels;

wherein the roof panel support member is supported from the rafters by support leg members;

wherein the roof panel support member comprises a circular cylindrical tube bent to follow the circular shape of the roof at the panels;

wherein each support leg member is U-shaped with a U-shaped strap portion wrapped around the cylindrical tube and with first and second legs of the support leg member attached to a respective one of the rafters.

According to a fourth aspect of the invention there is provided a roof structure for a cylindrical grain bin comprising:

a plurality of roof rafters, each extending from a lower end at a top edge of a wall of the bin to an upper end at a top support member, with the rafters being angularly spaced around the wall and with each rafter being inclined upwardly and inwardly from the wall to the top support member;

at least one row of sheet metal panels connected edge to edge so as to cover at least part of the rafters and define a conical roof;

wherein each of the rafters is formed from at least two rafter portions overlapped at a center part of the rafter between the upper and lower ends so that the center part is double thickness and therefore of increased strength;

and wherein the rafter portions are each formed of a profile which is Z-shaped in cross-section with a center web and two flanges at right angles to the center web such that the portions nest together in the overlapped center part with the center webs abutting.

Preferably each of the flanges includes a turn-back portion at right angles to the respective flange.

Preferably the flanges and the turn-back portions are arranged so that one flange of one portion fits inside a corresponding flange of the other portion.

Preferably each portion has one flange shorter than the other flange by a sufficient distance such that one fits inside the other.

BRIEF DESCRIPTION OF THE DRAWINGS

One embodiment of the invention will now be described in conjunction with the accompanying drawings in which:

FIG. 11 is a side elevational view of one of the rafters using the Z-shaped profile of FIG. 10 and providing two rafter portions.

FIG. 12 is a side elevational view of one of the rafters using the Z-shaped profile of FIG. 10 and providing three rafter portions.

In the drawings like characters of reference indicate corresponding parts in the different figures.

DETAILED DESCRIPTION

Figure 1:
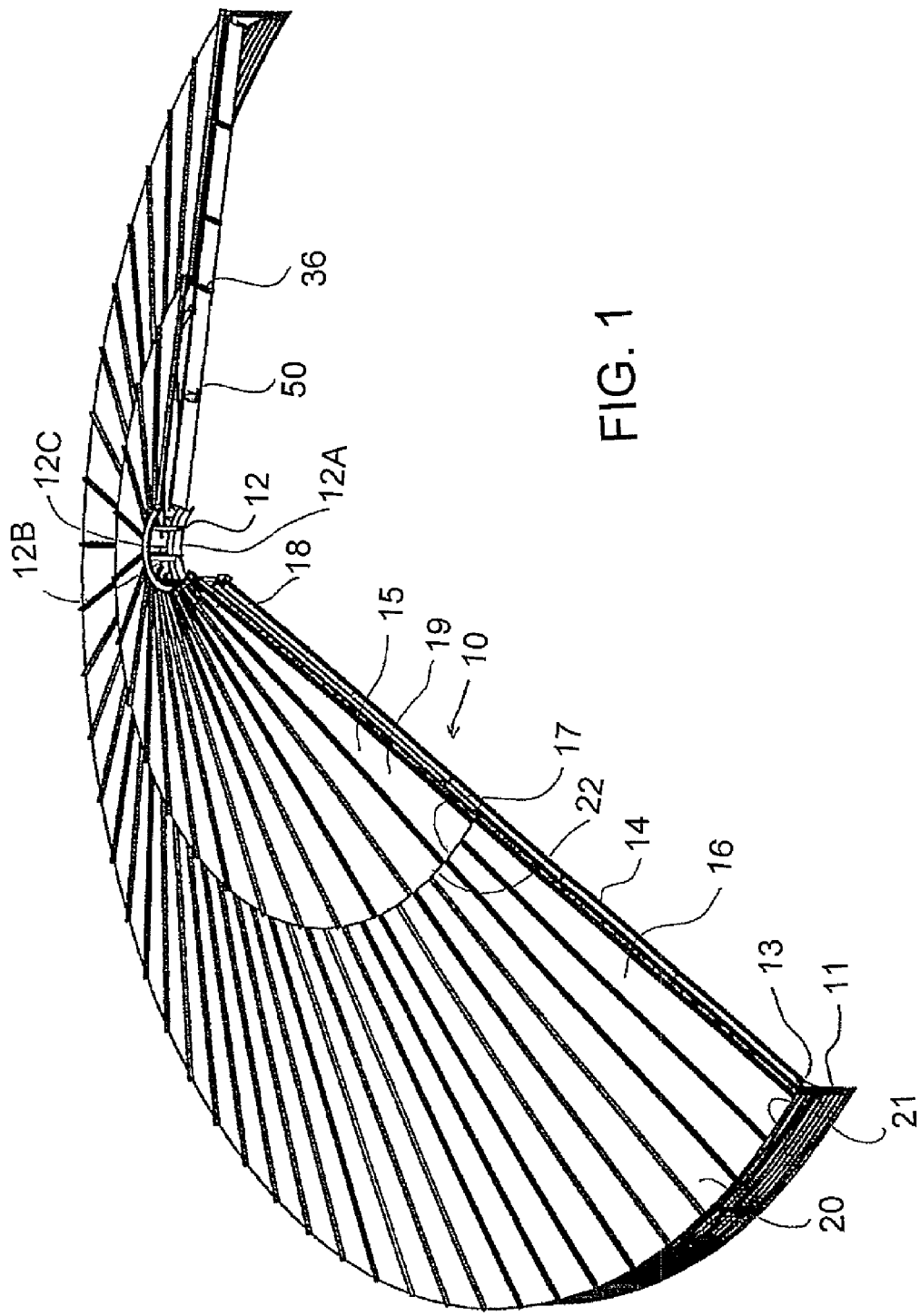
FIG. 1 is a perspective view of a roof of a grain bin partly cut away and including support structures according to the present invention.
Figure 2:
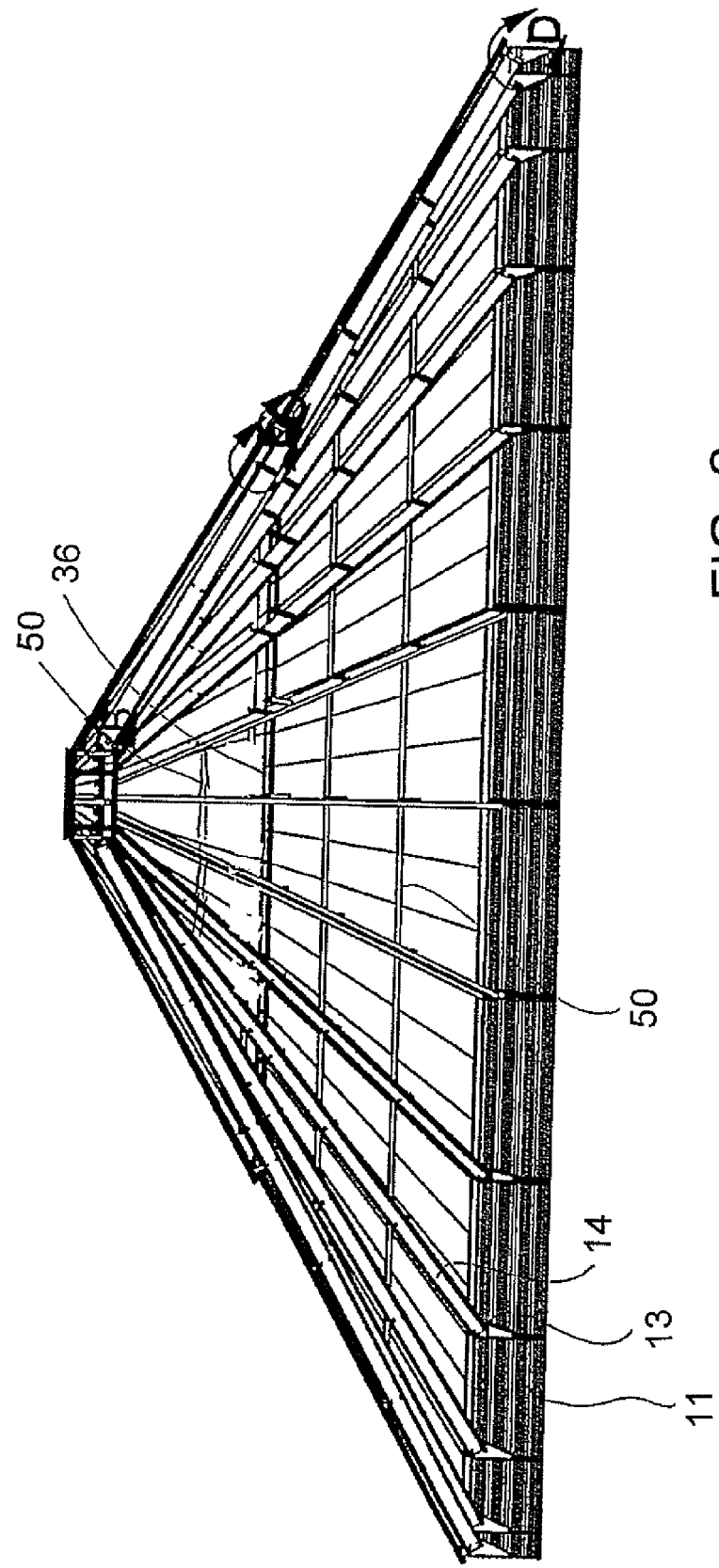
FIG. 2 is a side elevational view of the roof of FIG. 2 with some of the panels omitted to show the support system.

In FIGS. 1 and 2 is shown in general a roof structure 10 of a grain bin where the grain bin includes a wall 11 and a top ring 12. Only a part of the wall is shown for convenience of illustration and it will be appreciated that the wall forms a cylindrical structure standing on a circular base to a suitable height for containing a required quantity of grain or other particular material within the grain bin. Suitable techniques for constructing the wall are well known to persons skilled in the art.

The roof structure 10 extends from a support bracket 13 at the top of the wall upwardly to the top ring 12 which is located on a central vertical axis of the bin where the top ring 12 forms a circular opening through which the bin can be filled using arrangements well known to persons skilled in the art.

The roof structure 10 extending from the bracket 13 to the ring 12 must be arranged and designed to accommodate the necessary loading which typically includes of course its own weight, potential snow loading and also the significant effects of wind loading. The roof should be structurally sound so as to avoid flexing and unsuitable movements which can eventually lead to structural damage.

The roof includes a plurality of roof rafters 14 which are inclined upwardly and inwardly from the bracket 13 to the ring 12. The rafters extend the full length from the bracket to the ring with the rafters being arranged at angularly spaced positions around the vertical central axis of the bin so that the rafters lie on a cone at a suitable roof angle which can vary depending upon requirements but is typically in the range 20 to 40 degrees and typically 30 degrees. The rafters can be formed from tubes or from channel members or from a Z-shaped structure described hereinafter. The rafters may be formed from elements which form one single integral member running the whole length but typically when they are longer than 40 feet it is necessary to form the rafters in separate connected pieces for transportation.

On top of the rafters is mounted a series of roof panels including an upper row 15 of the panels and a lower row 16 of the panels 16. In a roof having a diameter greater than of the order of 30 feet, it is desirable to provide two such rows of the panels, bearing in mind that the width of the panels at their widest point is limited by manufacturing techniques. Thus each panel of the upper row extends from a circular lower end of the row indicated at 17 up to an upper end 18 at the ring with each panel 19 of the row 15 converging upwardly and inwardly. Similarly the row 16 includes a series of panels 20 which extend from a circular lower end 21 at the wall 11 to a circular upper end 22 at the lower end 17 of the upper row.

Some bins of a smaller diameter may include only a single row but may use some of the features described hereinafter. Some bins may have a third row of panels.

Figure 3:
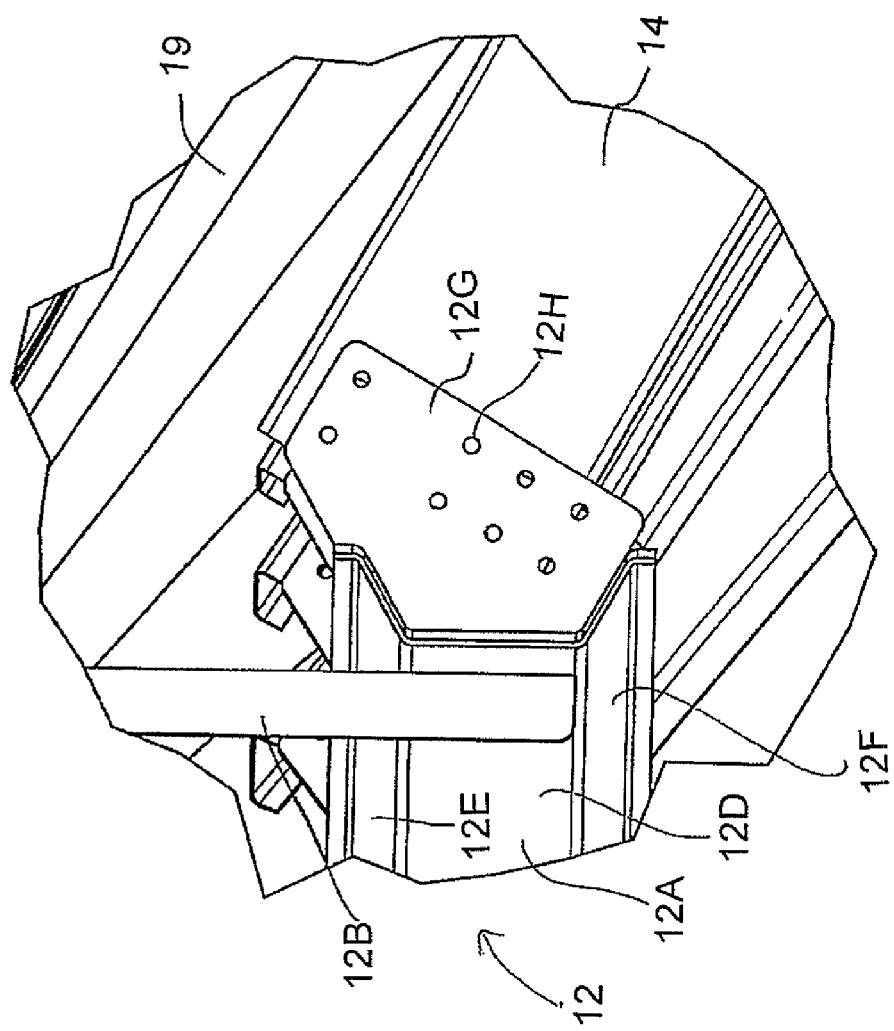
FIG. 3 is a perspective view of one detail of the roof of FIGS. 1 and 2 showing the connection of the top end of the rafters to the top ring.

Turning now to FIG. 3, the structure at the upper ring 12 is shown in more detail and comprises an annular ring 12A which connects by upstanding posts 12B to a top ring 12C. The ring 12A forms a channel member with a base 12D and sides 12E and 12F which contain and support a series of brackets 12G at spaced positions around the outside surface of the ring 12A. Each bracket 12G attaches to the top of a respective rafter 14 by way of a series of bolts 12H which bolt to the upper end of the rafter and hold the rafter in position at the ring 12A. It will be appreciated that all of the rafters are inclined upwardly and inwardly and thus apply a loading to the ring 12A to provide a stable structure defining the conical support for the roof panels. As an alternative, the upper ring may be of a welded construction.

Figure 4:
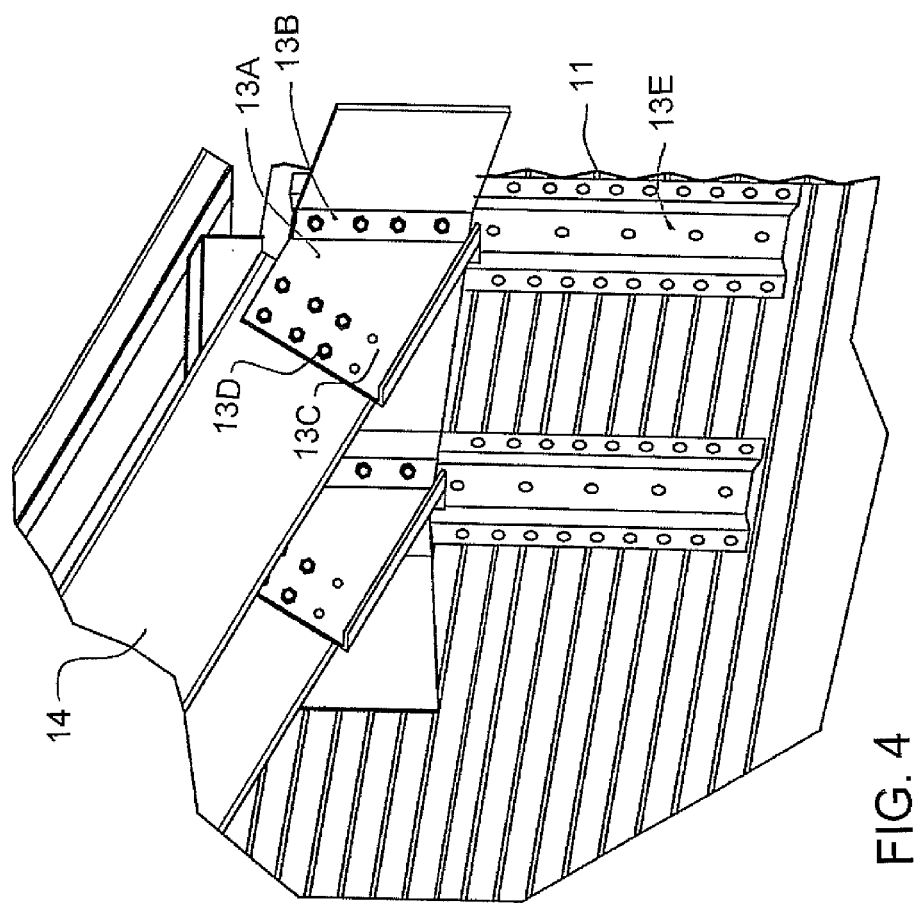
FIG. 4 is a perspective view of one detail of the roof of FIGS. 1 and 2 showing the connection of the bottom end of the rafters to the wall.

In FIG. 4 is shown the connection of the rafters 14 to the wall 11 by way of a series of brackets 13A at spaced positions around the top of the wall. The brackets are fastened to the wall by an outer vertical flange 13B and define plate members 13C with an array of holes 13D by which the plate 13C is bolted to the lower end of the rafter 14. The plates are attached to vertical stiffener channels 13E connected to the wall 11 at spaced positions around the wall.

Figure 5:
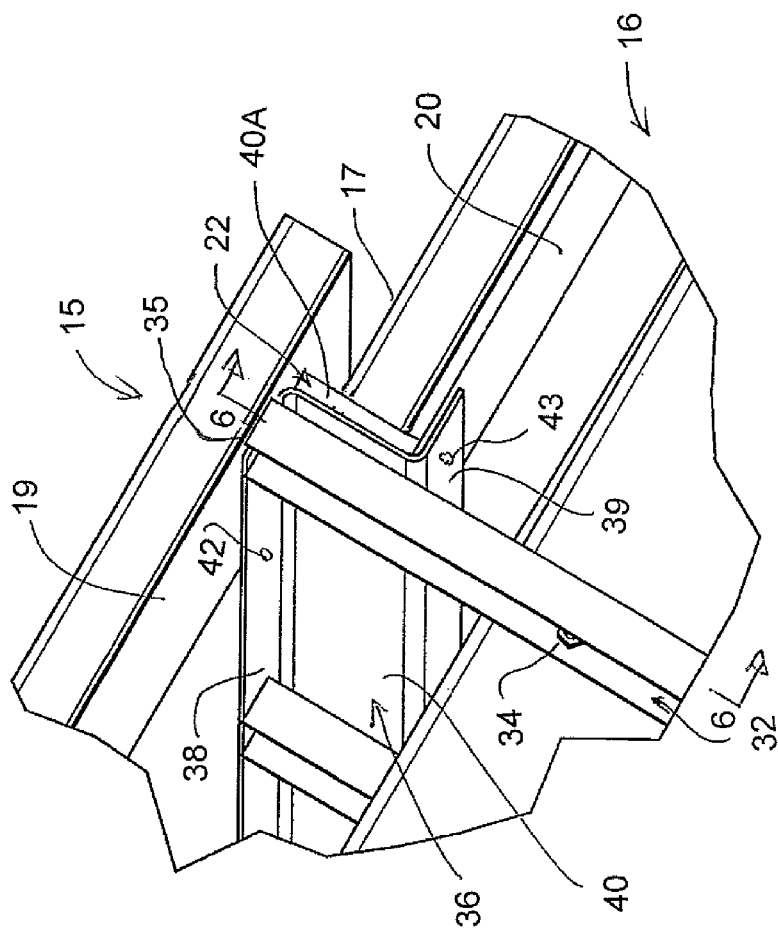
FIG. 5 is a perspective view of one detail of the roof of FIGS. 1 and 2 showing the support bracket which connects the bottom end of the upper row of panels to the rafters and to the top end of the lower row of panels.

Turning now to FIG. 5, further detail is shown of the construction at the lower end 17 of the upper row 15 of panels 19 and the upper end 22 of the panels 20 of the row 16.

Figure 6:
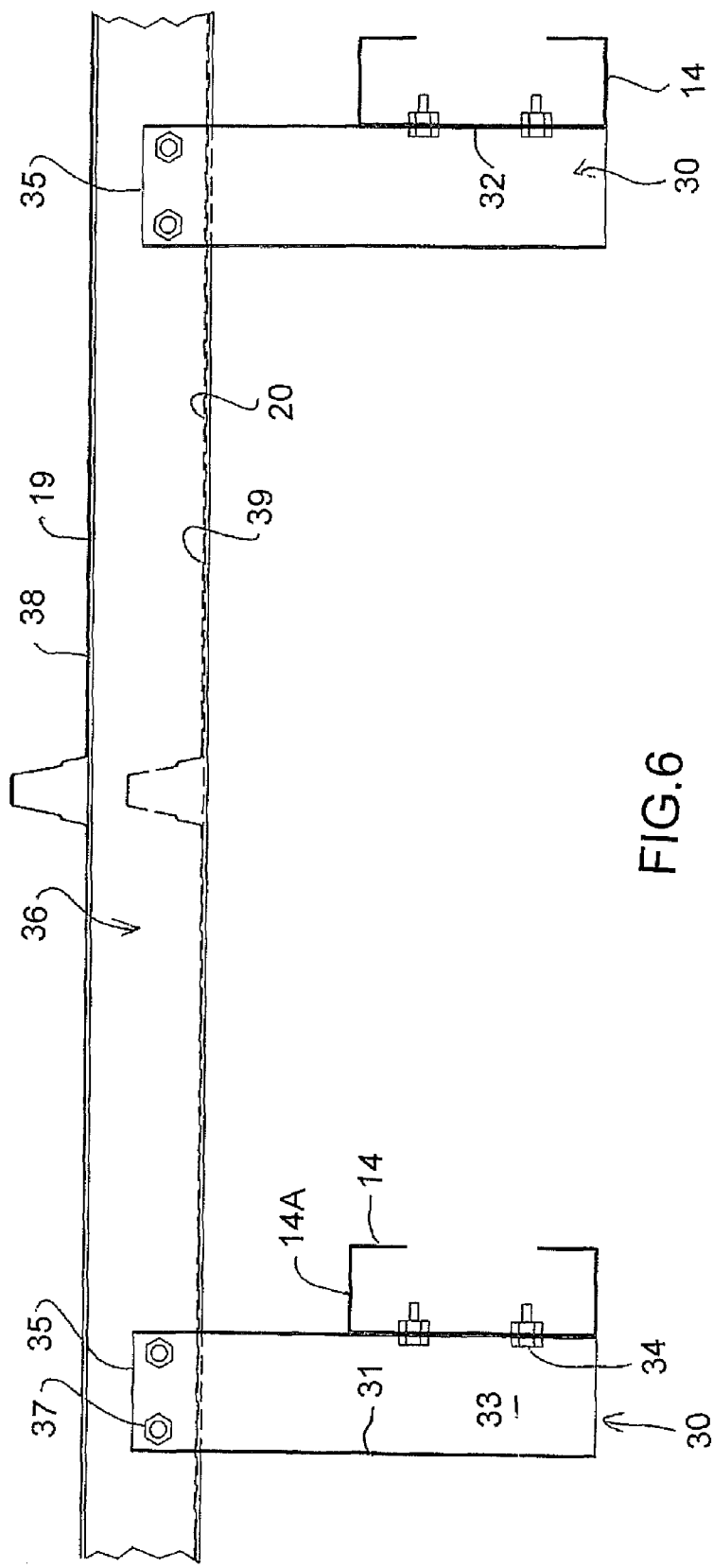
FIG. 6 is a cross sectional view along the lines 6-6 of FIG. 5.

At each rafter 14 is provided a support leg 30 which is bolted to one side of the rafter 14 as best shown in FIG. 6. The leg 30 is formed as a channel member with a pair of side flanges 31 and 32 and a base web 33. A side flange 32 is fastened to the face of the rafter 14 by bolts 34 so that the leg is in fixed position standing upwardly and outwardly from the upper surface 14A of the rafter to a top edge 35 of the leg spaced upwardly from the top surface 14A of the rafter.

A Z-shaped bracket 36 is attached to the upper ends of the legs 30 by bolts 37. Thus the Z-shaped bracket 36 includes a top flange 38 and a bottom flange 39 together with an intermediate web 40. The web 40 extends at right angles to the top surface 14A of the rafters so that it stands upwardly and outwardly from the rafters. The flange 39 extends from the web 40 at right angles to the web 40 in a direction downwardly of the roof. The flange 38 extends at right angles to the web 40 in a direction upwardly of the roof. The flanges 38 and 39 are therefore parallel and spaced by the height of the web 40. The bottom flange 39 is spaced upwardly from the top surface 14A of the rafters and is carried at that position by support from the legs 30. The web 40 is bolted to the web 33 of each of the legs. The web 40 of the Z-shaped bracket thus forms a circular band around the roof at a height spaced upwardly from the rafters. As the bracket is spaced upwardly from the rafters it can be totally circular and define the flanges 38 and 39 which lie in a circle which is independent of lines interconnecting the rafters since the circle is located wholly above the rafters. The flange 38 thus provides a circular surface onto which the lower end of each of the panels 19 of the upper row 15 can be fastened. As best shown in FIG. 5, the panels are fastened to the flange 38 by a series of fastening bolts 42 at spaced positions around the flange 38. The panels 19 have a project slightly beyond the flange so as to project downwardly below the web 40 and thus over the top of the upper end 22 of the panels 20 to form a slight overlap section acting to shed rain and other materials falling over the roof surface.

Similarly the flange 39 forms a circular band around the roof at a height above the rafters and thus independent of lines between the rafters. The upper end 22 of the panels 20 is fastened to the flange 39 by a series of bolts 43. The upper end 22 of the panels butts against the web 40 or against a gasket 40A lying against the web 40.

The web 40 and its gasket 40A thus forms a barrier between the top surface of the panels 20 and the lower row 16 and the bottom surface of the panels 19 of the upper row 15. This barrier therefore inhibits or prevents the flow of air upwardly between the two rows so as to inhibit the penetration of rain or other materials carried with that air.

The upper end 18 of the panels 19 of the upper row 15 are carried on the upper ring 12C of the ring member 12 so that these upper edges are also supported at a height above the rafters. In this way the panels are carried not on the rafters themselves but on the upper and lower rings which are circular rather than segmented as is a line interconnecting the top edges 14A of each of the rafters.

As best shown in FIG. 6, the panels 19 and 20 of the upper and lower rows are generally flat as indicated at 19A and include raised connecting sections at the edges of adjacent panels thus forming a rib running along the side edges of the panels from the bottom edge upwardly to the top edge of each of the panels.

Figure 7:
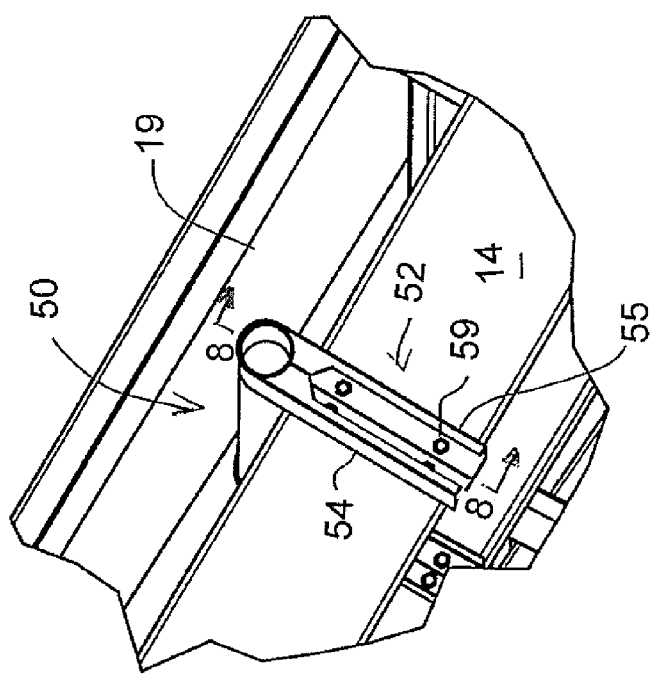
FIG. 7 is a perspective view of one detail of the roof of FIGS. 1 and 2 showing the panel support tube which is located at a mid height of one of the rows of panels.
Figure 8:
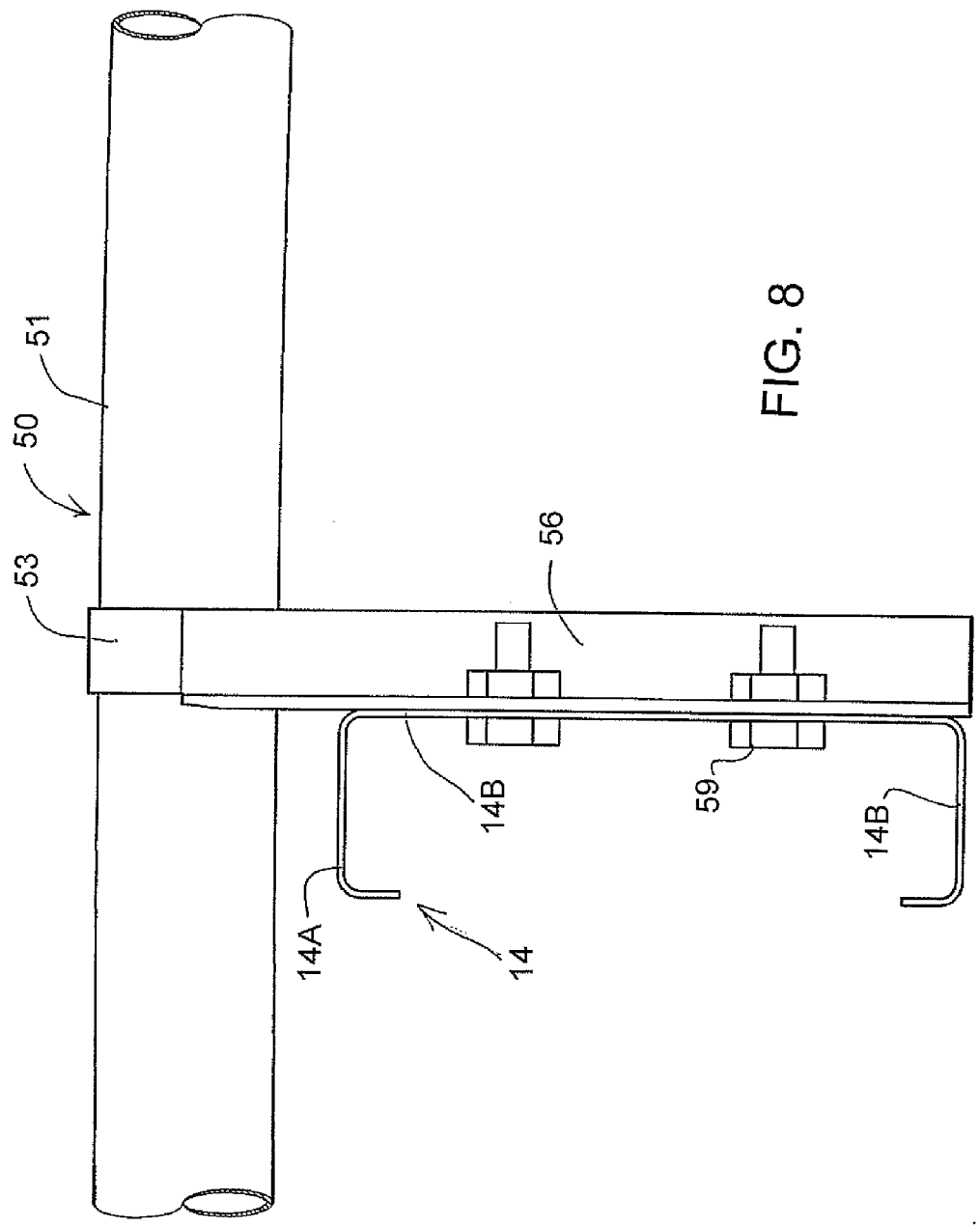
FIG. 8 is a cross sectional view along the lines 8-8 of FIG. 7.
Figure 9:
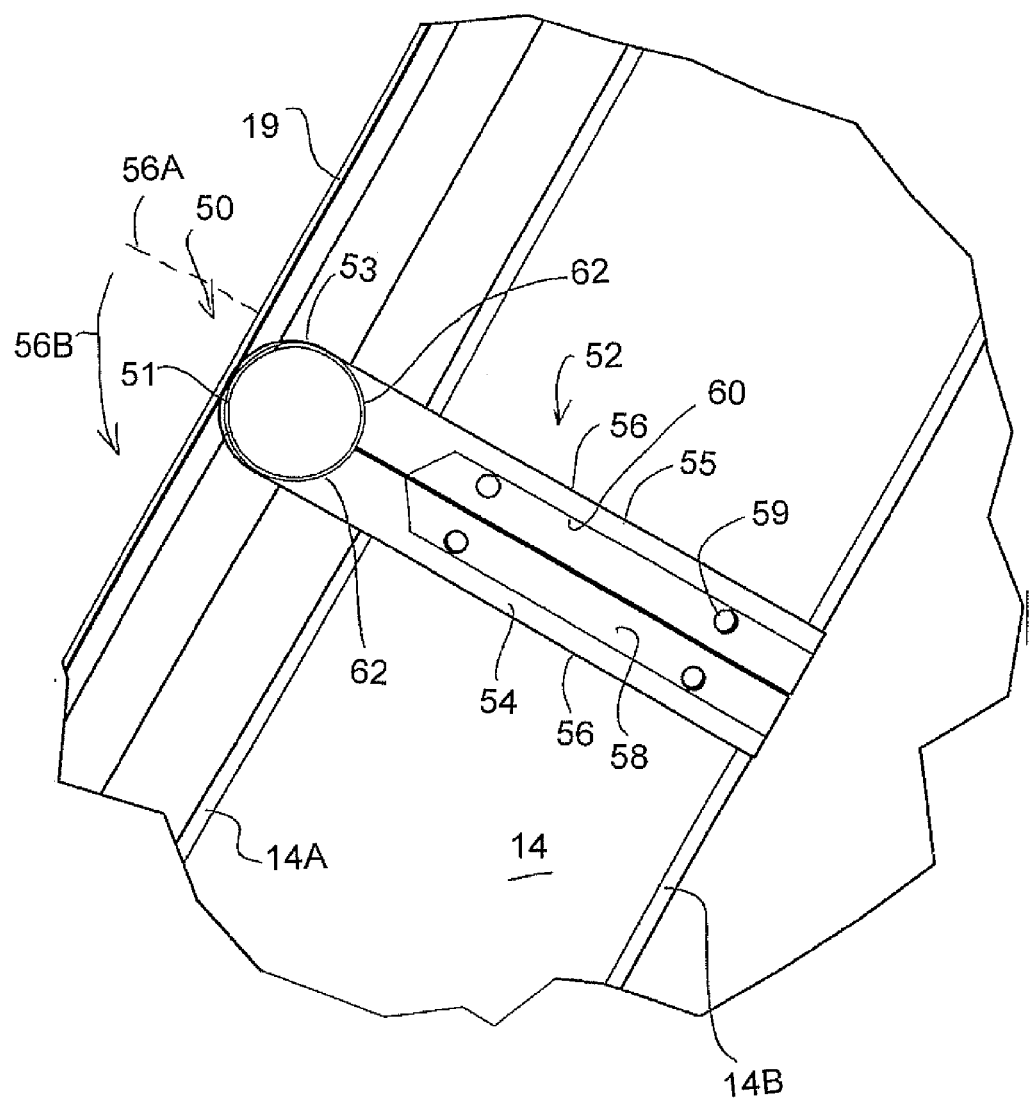
FIG. 9 is a cross sectional view along the lines 9-9 of FIG. 8.

Turning now to FIGS. 7, 8 and 9, a roof support 50 is shown which is located partway along the length of the panels so as to provide intermediate support for the panels between the upper edge and the lower edge of the panels. In some roof constructions of a larger diameter, a panel support 50 can be provided midway along the height of the panels 19 and also midway along the height of the panels 20. In other constructions more than one such panel support member can be provided between the upper and lower edges of rows of panels or a smaller row of panels may include no such support.

The support structure 50 comprises a cylindrical tube 51 which is curved to the required diameter to form an accurate circle for encompassing the roof rafters at the required height. The tube 51 is formed from tube portions connected end to end to form a continuous tube structure around the full diameter. The tube 50 is supported from the rafters 14 and a height above the upper surface 14A of each of the rafters. The tube 51 is supported at each rafter by a supporting leg member 52. The supporting leg member 52 includes a strap portion 53 which wraps around the periphery of the tube through an angle of slightly greater than 180° of the tube with two legs 54 and 55 extending from ends 53A and 53B of the strap 53. The strap 53 is formed as a single sheet of metal of a width sufficient to clamp the tube 51. The legs 54 and 55 comprise a base web 56 and two side flanges 57 and 58 extending at right angles to the web 56. The flange 58 of each of the legs 54 and 55 is bolted to a side face 14B of the rafter 14. Thus bolts 59 pass through the flange 58 between an edge 60 of the flange and the web 56 so as to clamp the outside surface of the flange 58 onto the side 14B of the rafter. The flange 57 is spaced outwardly away from the side 14B of the rafter so that the bracket itself defined by the strap 53 is positioned alongside the side of the rafter and extends upwardly and outwardly from the rafter so as to hold the tube 51 supported away from the surface 14A of the rafter.

The flanges 57 and 58 include a part circular edge portion 62 which engages around the part of the periphery of the tube 51 which is not wrapped by the strap 53. Thus the tube 53 is held down by the strap 53 onto the receptacles or cradles formed by the edges of the flanges 57 and 58. A bolt 63 clamps together the webs 56 of the two legs so that the legs are squeezed together thus clamping the tube 51 between the cradles or receptacles 62 and the strap 53.

In assembly of the structure, the leg members defined by the strap 53 and the two legs 54 and 55 are supplied with the strap straight so as to extend outwardly from the leg 55 in a straight line. Thus the leg 55 is bolted to the side of the rafter and the cradle 62 of the legs 55 thus form a receptacle around the whole periphery of the roof at the rafters for receiving the tube 51. Thus in a first step of the assembly, the legs 55 of the leg members are bolted to each of the rafters to form the receptacle onto which the tube 51 can be assembled. The tube 51 is then assembled to form the required circle and is dropped into place into the cradle 62 and sits stably in place in those cradles allowing the leg 56 to be pulled from its initial straight position 56A around in a direction 56B until a leg is pulled down tight as indicated at the arrow 56C into its position where it can be bolted onto the rafter 14 and clamped to the tube 51.

Figure 10:
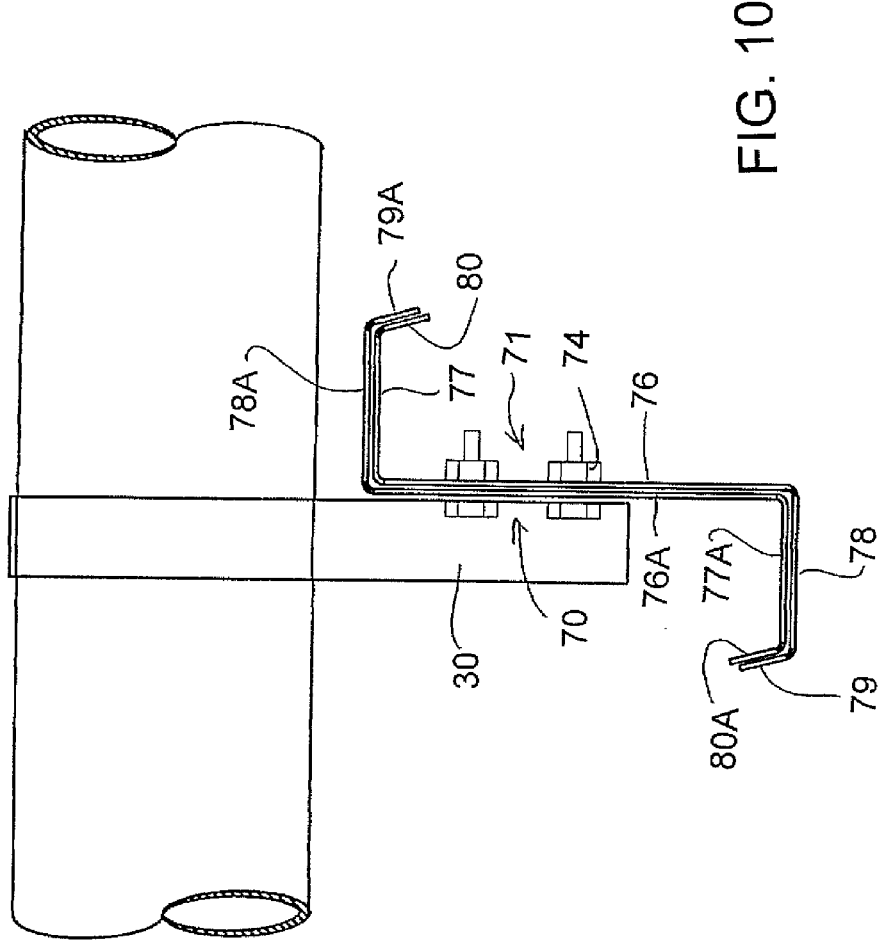
FIG. 10 is a cross-sectional view similar to that of FIG. 8 showing a modified embodiment using a Z-shaped profile for the rafters.

In FIG. 6 the rafters 14 are shown as C-channels. In FIG. 8 the rafters are shown as tubes. In FIGS. 10, 11 and 12 is shown an alternative form of the rafter which is constructed using a Z-shaped member. Thus in FIG. 10, the rafter is formed from two or more sections 70, 71 of a Z-shaped profile 73. In FIG. 11, two of the sections are overlapped in a central area 72 where the sections are fastened together by screw fasteners 74. In FIG. 12, three sections 70, 71 and 75 are provided where the section 74 overlaps sections 70 and 71 and acts as a joining portion therebetween. Thus the sections 70 and 71 in FIG. 12 butt at a center 75 and the section 75 overlaps both. Both of these arrangements provide a central area which is of double thickness to provide an increased strength between the ends of the rafter in the central area where additional strength is required as is known for such beam structures.

The Z-shaped profile as shown in FIG. 10 comprises a center web 76, a first flange 77 at right angles to the center web 76 at one end of the web 76 and a second flange 78 at right angles to the center web 76 and connected to the web 76 at the opposite end. Each of the flanges 77 and 78 includes respective a turn-back portion 79, 80 respectively at right angles to the respective flange to provide strength in the respective flange. The portion 70 of the profile overlaps with the portion 71 of the profile so that the portions mate with one sliding into the other to provide a nested arrangement at the overlapping section with the webs 76 in contact and connected by the fasteners 74. The ability to overlap or nest is provided by arranging the components of the portion 71, that is the web 76A, the flanges 77A and 78A and the turn-back portions 79A and 80A so that the flange 77 fits inside the corresponding flange 78A and the flange 77A fits inside the corresponding flange 78. This is achieved by arranging the flange 77, 77A to be shorter than the flange 78, 78A by a sufficient distance, typically slightly greater than twice the thickness of the material, such that one fits inside the other as shown.

Another advantage of the use of a Z-shaped profile for the rafter is that the flanges 77A and 78 sit underneath the bottom end of the leg members 52 and the legs 30 to contain the bottom end to prevent it from projecting downwardly into a dangerous location during erection of the bin.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A roof structure having an upstanding cylindrical wall comprising:
   a plurality of roof rafters, each extending from a top edge of the wall to a top support member, with the rafters being angularly spaced around the wall and with each rafter being inclined upwardly and inwardly from the wall to the top support member;
   at least one row of sheet metal panels connected edge to edge so as to cover at least part of the rafters and define a conical roof;
   wherein there is provided at least one roof panel support member supported from the rafters above the rafters for supporting the panels of said at least one row of panels;
   said roof panel support member being located at a position part way down the panels;
   the roof panel support member being circular so as to engage all of the roof panels supported thereby substantially across the full width of each panel;
   wherein the roof panel support member is supported from the rafters to hold the roof panel support member and the panels engaged thereby spaced upwardly from the rafters.

2. The roof structure according to claim 1 wherein the roof panel support member is formed from a tube bent to follow the circular shape of the roof at the panels.

3. The roof structure according to claim 2 wherein the tube is circular in cross section.

4. The roof structure according to claim 1 wherein the roof panel support member is supported from the rafters by support leg members, each of which extends upwardly from a respective one of the rafters to hold the roof panel support member and the panels engaged thereby spaced upwardly from the rafters.

5. The roof structure according to claim 4 wherein each support leg member is U-shaped to define a base arranged to wrap partly around the roof panel support member and first and second legs extending from the base, with the first and second legs of the support leg member each attached to the respective rafter.

6. The roof structure according to claim 5 wherein each support leg member has a receptacle into which the roof panel support member sits while the roof panel support member is supported from the rafter by the first leg which is attached to the rafter and while the second leg member is bent around the roof panel support member for attachment to the rafter.

7. The roof structure according to claim 4 wherein the roof panel support member comprises a cylindrical tube and each support leg member has the base thereof forming a semi-cylindrical strap portion bent around the tube and supported by the first and second legs.

8. The roof structure according to claim 7 wherein at least the first leg has a support receptacle at a bottom of the strap portion for supporting the tube above the respective rafter while the strap portion is bent around the tube by pulling the second leg.

9. The roof structure according to claim 5 wherein the support leg member is bolted between the first and second legs immediately underneath the roof panel support member so as to clamp the roof panel support member at the base.

10. A roof structure for a structure having an upstanding cylindrical wall comprising:
a plurality of roof rafters, each extending from a top edge of the wall to a top support member, with the rafters being angularly spaced around the wall and with each rafter being inclined upwardly and inwardly from the wall to the top support member;
a plurality of sheet metal panels connected edge to edge so as to cover the rafters and define a conical roof covering an open area within the wall;
the panels including an upper row of panels connected edge to edge and extending from the top support member to a circular bottom edge of the upper row spaced part way down the rafters;
the panels including a lower row of panels connected edge to edge and extending from a circular top edge of the lower row adjacent the circular bottom edge of the upper row to a circular bottom edge of the lower row;
and a bracket member carried on the rafters for supporting the circular bottom edge of the upper row and the circular top edge of the lower row;
the bracket member forming substantially a ring spanning the rafters at the circular bottom edge of the upper row and the circular top edge of the lower row;
the bracket member including an upper flange engaging the circular bottom edge of the upper row, a lower flange engaging the circular top edge of the lower row and an interconnecting web portion connecting the upper and lower flanges
wherein the bracket member is supported relative to the rafters at a position with the lower flange spaced upwardly from the rafters so as to support the circular top edge of the panels of the lower row spaced upwardly from the rafters.

11. The roof structure according to claim 10 wherein the bracket member is supported relative to the rafters on a plurality of support legs, with each leg being attached to a respective one of the rafters and standing upwardly therefrom to the bracket member.

12. The roof structure according to claim 10 wherein the upper and lower flanges of the bracket member are parallel and spaced by the height of the interconnecting web portion.

13. The roof structure according to claim 10 wherein the interconnecting web portion is imperforate and extends around the full periphery of the roof so as to act as a barrier to prevent penetration of moisture between the circular top edge of the lower row and the circular bottom edge of the upper row.

14. The roof structure according to claim 10 wherein there is provided at least one roof panel support member supported from the rafters at a height above the rafters for supporting the panels of at least one of the upper row of panels and the lower row of panels, said roof panel support member being located at a position part way down the panels, the roof panel support member being circular so as to engage all of the roof panels supported thereby substantially across the full width of each panel.

15. The roof structure according to claim 14 wherein the roof panel support member is formed from a tube bent to follow the circular shape of the roof at the panels.

16. The roof structure according to claim 15 wherein the tube is circular in cross section.

17. The roof structure according to claim 14 wherein the roof panel support member is supported from the rafters by support leg members, each of which extends upwardly from a respective one of the rafters to hold the roof panel support member and the panels engaged thereby spaced upwardly from the rafters.

18. The roof structure according to claim 17 wherein each support leg member is U-shaped to define a base arranged to wrap partly around the roof panel support member and first and second legs extending from the base, with the first and second legs of the support leg member each attached to the respective rafter.

19. The roof structure according to claim 18 wherein each support leg member has a receptacle into which the roof panel support member sits while the roof panel support member is supported from the rafter by the first leg which is attached to the rafter and while the second leg member is bent around the roof panel support member for attachment to the rafter.

20. The roof structure according to claim 18 wherein the roof panel support member comprises a cylindrical tube and each support leg member has the base thereof forming a semi-cylindrical strap portion bent around the tube and supported by the first and second legs.

21. The roof structure according to claim 20 wherein at least the first leg has a support receptacle at a bottom of the strap portion for supporting the tube above the respective rafter while the strap portion is bent around the tube by pulling the second leg.

22. The roof structure according to claim 18 wherein the support leg member is bolted between the first and second legs immediately underneath the roof panel support member so as to clamp the roof panel support member at the base.

23. The roof structure according to claim 14 wherein there is provided a first roof panel support member for supporting the upper row of panels and a second roof panel support member for supporting the lower row of panels.

24. The roof structure according to claim 10 wherein each of the roof rafters is formed from at least two rafter portions overlapped at a center part of the rafter between the upper and lower ends so that the center part is double thickness and therefore of increased strength and wherein the rafter portions are each formed of a profile which is Z-shaped in cross-section with a center web and two flanges at right angles to the center web such that the portions nest together in the overlapped center part with the center webs abutting.

25. The roof structure according to claim 24 wherein each of the flanges includes a turn-back portion at an angle to the respective flange.

26. The roof structure according to claim 25 wherein the flanges and the turn-back portions are arranged so that one flange of one portion fits inside a corresponding flange of the other portion.

27. The roof structure according to claim 26 wherein each portion has one flange shorter than the other flange by a sufficient distance such that one fits inside the other.

28. A roof structure for a structure having an upstanding cylindrical wall comprising:
- a plurality of roof rafters, each extending from a top edge of the wall to a top support member, with the rafters being angularly spaced around the wall and with each rafter being inclined upwardly and inwardly from the wall to the top support member;
- at least one row of sheet metal panels connected edge to edge so as to cover at least part of the rafters and define a conical roof;
- wherein there is provided at least one roof panel support member supported from the rafters above the rafters for supporting the panels of said at least one row of panels;
- wherein the roof panel support member is supported from the rafters by support leg members;
- wherein the roof panel support member comprises a tube bent to follow the circular shape of the roof at the panels;
- wherein each support leg member is an inverted U-shape with a base and first and second legs;
- wherein the base forms a strap portion wrapped around the tube so as to follow an outside shape of the tube;
- wherein the first and second legs of the support leg member are attached to a respective one of the rafters so as to stand upwardly therefrom to support the base and the tube;
- and wherein the first and second legs each include at least one flange thereon to provide upward support for the tube.

29. The roof structure according to claim 28 wherein at least the first leg has a support receptacle at a bottom of the strap portion for supporting the tube above the respective rafter while the strap portion is bent around the tube by pulling the second leg.

30. The roof structure according to claim 28 wherein the support leg member is bolted between the first and second legs immediately underneath the tube so as to clamp the tube at the strap portion.

31. The roof structure according to claim 28 wherein the legs and the band portion are formed from an integral metal panel wherein said at least one flange of each leg is bent from the panel.

32. The roof structure according to claim 31 wherein said at least one flange of each leg comprises a pair of side flanges of each leg where each side flange includes an end edge at the tube which is shaped to match an exterior shape of the tube to support the tube.

33. The roof structure according to claim 28 wherein the tube is circular in cross-section and the strap portion is semi-cylindrical around the tube.

* * * * *